V. G. APPLE.
POWER TRANSMISSION GEARING.
APPLICATION FILED JUNE 15, 1911.
1,051,055.
Patented Jan. 21, 1913.
3 SHEETS—SHEET 1.
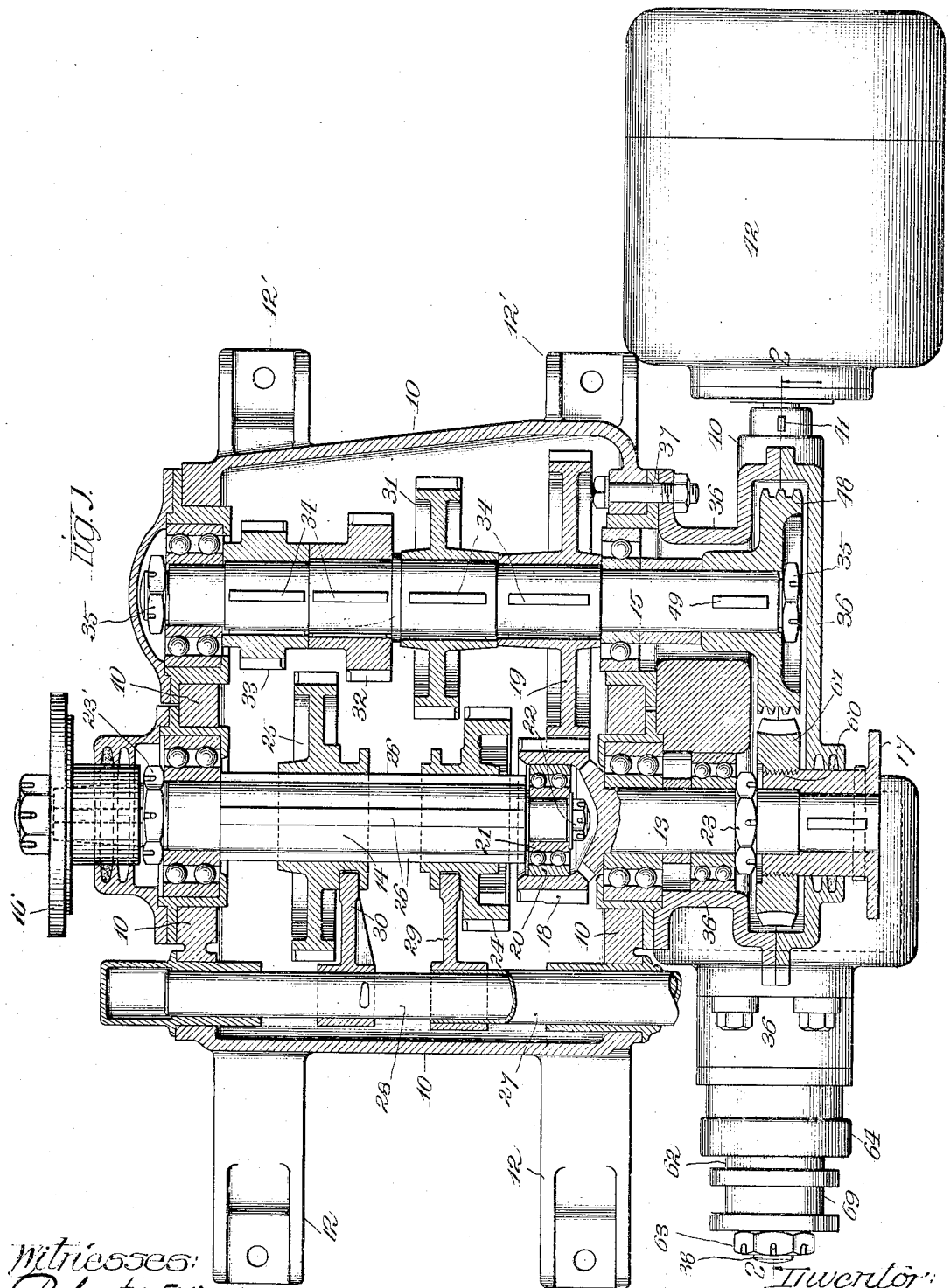

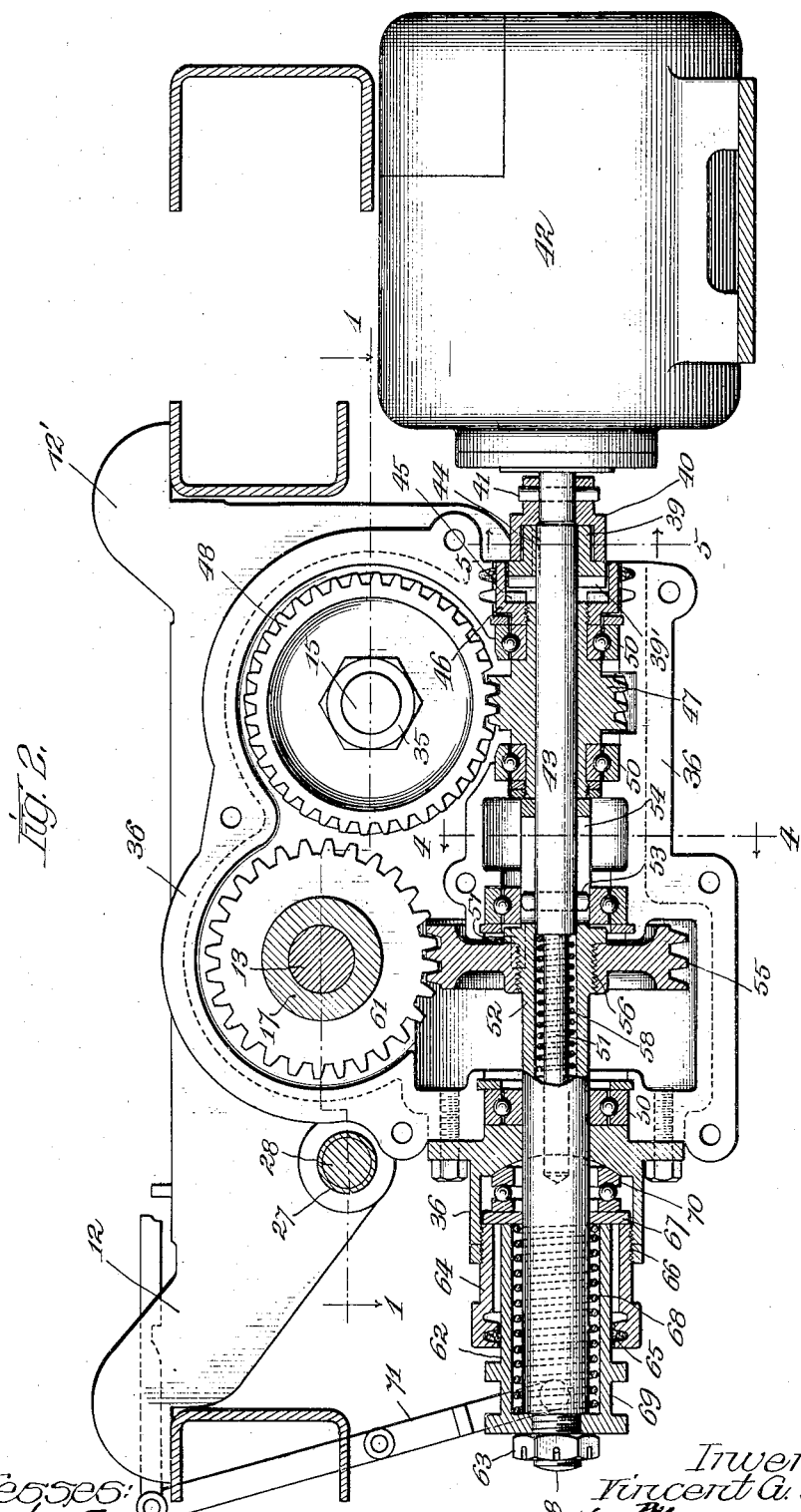

V. G. APPLE.
POWER TRANSMISSION GEARING.
APPLICATION FILED JUNE 15, 1911.
1,051,055.
Patented Jan. 21, 1913.
3 SHEETS—SHEET 3.
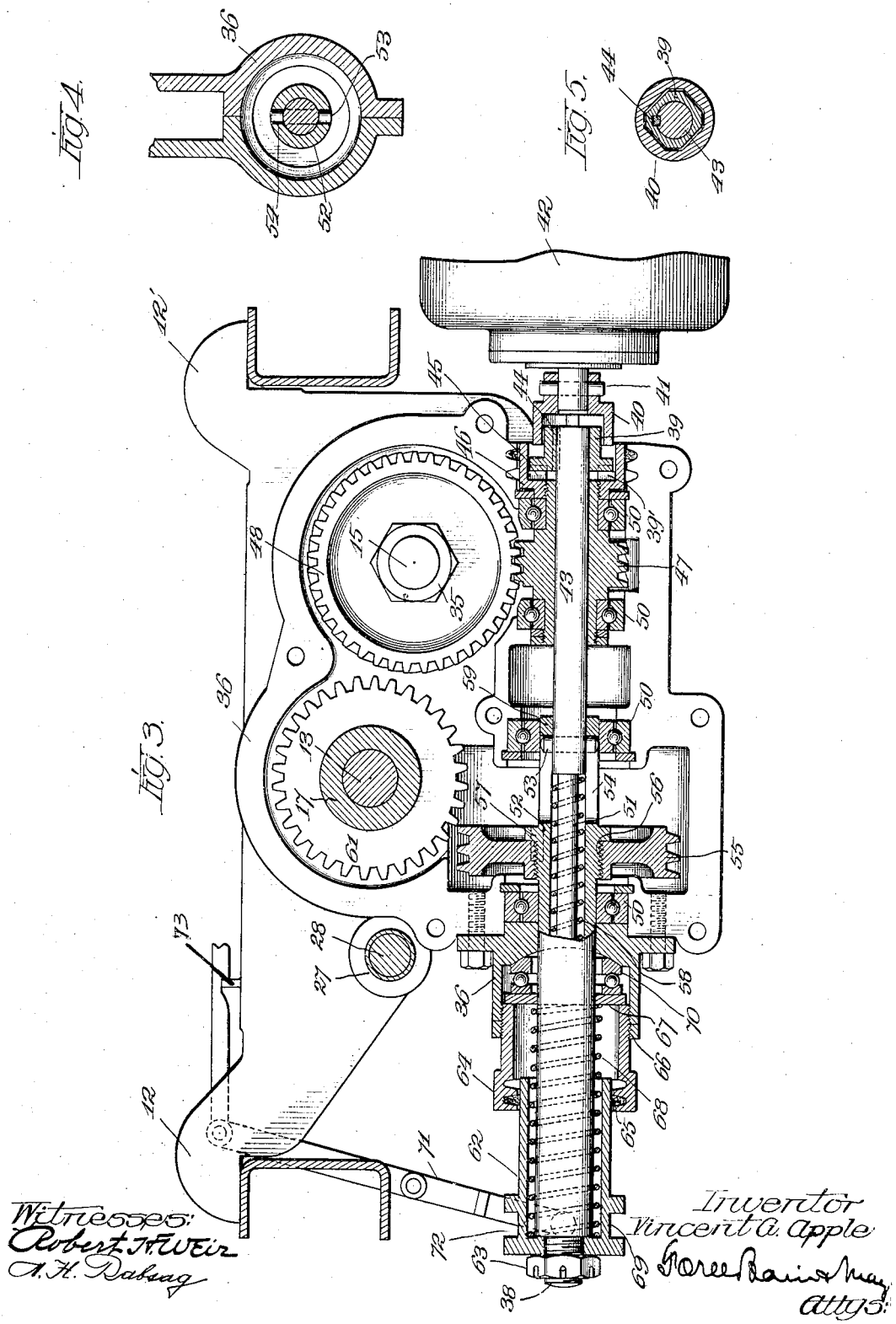

UNITED STATES PATENT OFFICE.

VINCENT G. APPLE, OF DAYTON, OHIO.

POWER-TRANSMISSION GEARING.

1,051,055.  Specification of Letters Patent.  Patented Jan. 21, 1913.

Application filed June 15, 1911. Serial No. 633,235.

*To all whom it may concern:*

Be it known that I, VINCENT G. APPLE, a citizen of the United States, residing at Dayton, in the county of Montgomery and State of Ohio, have invented certain new and useful Improvements in Power-Transmission Gearing, of which the following is a specification.

The object of my invention is to provide a power transmission gearing, whereby the internal combustion engine, of an automobile, boat or the like, usually employed for furnishing the motive power for such vehicles, may, by the use of a dynamo electric machine and a suitable source of electric current such as a storage battery, be initially set in motion and so continued until it becomes self operated, when, by a separate shift of the elements of my gearing, the engine becomes a driver of the dynamo-electric-machine, as a current generator, and, preferably, at a different relative speed.

My driving gear is especially well adapted to be used in connection with the usual speed-changing transmission gearing, of automobiles, and in most instances may be applied thereto without necessitating any material changes in such structure.

Other and further objects of my invention will become readily apparent to persons skilled in the art from a consideration of the description, hereafter contained, taken in conjunction with the drawings, wherein;
Figure 1 is a sectional plan view of the speed changing transmission gearing, with my driving device attached thereto, the section being taken on line 1—1 of Fig. 2. Fig. 2 is a longitudinal, vertical section, of my driving device on line 2—2 of Fig. 1, showing the dynamo-electric machine operating as a motor and in the act of starting the engine, the parts of the driving mechanism being in proper positions for this purpose.
Fig. 3 is a similar view, to Fig. 2, showing the parts in position for the dynamo to be driven, as a current generator, by the engine. Fig. 4 is a section taken on line 4—4 on Fig. 2. Fig. 5 is a section taken on line 5—5 of Fig. 2.

The walls of the housing, of a typical speed-changing transmission mechanism for automobiles, are indicated by 10. The housing is provided with the usual supporting arms 12 that rest upon the sub-frame of the chassis of an automobile.

The speed-changing transmission device contains three independently rotatable shafts; the engine shaft, 13, the load shaft, 14, and the counter shaft, 15, as usual in such devices.

The shaft (not shown) that is usually included between the differential gearing,—that is, connected to the traction wheels of the automobile and the load shaft 14 of the speed-changing transmission device,—is secured to the shaft 14 as by a flange coupling 16, indicated in dotted lines in Fig. 1, and the engine is to be directly connected to a similar flange coupling 17 on the out board end of the shaft 13.

It will be observed that the engine shaft 13 is provided on its inboard end with a hollow integral spur-gear wheel, 18, which is in constant mesh with the gear wheel 19, fixed upon the counter shaft 15. The hollow gear wheel 18 carries one member, 20, of a ball bearing, the other member, 21, being carried by the shaft 14. By this means the relative motion of the shaft 13 and 14 is accomplished with a minimum friction. A nut, 22, on the end of the shaft, 14, holds the ball bearing member 21 in place. Longitudinally adjustable nuts 23—23' are used to take up the longitudinal lost motion of the shafts 13 and 14, respectively.

Gear wheels 24 and 25, differing in diameter, are rotatably fixed to the shaft 14, but are longitudinally movable thereon. The four feathers, 26, are the means by which the said gear wheels are rotatably secured to the shaft 14, and permitted to be shifted along the shaft. A compound longitudinally movable shaft operable from the driver's seat and consisting of the elements 27 and 28, carry fingers 29 and 30, respectively, for longitudinally and independently moving the gear wheels 24, and 25, respectively, on the shaft 14.

In the positions shown in Fig. 1, if the engine shaft 13 be rotated, only the counter shaft 15 will be rotated in response thereto, the power shaft, 14, remaining idle, because there is now, no connection between the counter shaft and the power shaft.

The gear wheel 24 is provided with internal gear teeth that are adapted to make rotatable connection with the external gear teeth of the wheel 18, and when the gear wheel, 24, is moved toward the engine end of the speed transmission device, and engagement of the two wheels is thereby effected, shaft 13 will rotate shaft, 14, directly, and of even speed therewith.

The gear wheels 31, 32, and 33 are fixed to the counter shaft 15, by means of keys 34.

If the gear wheel 24 be moved rearwardly on the shaft 14, so that it will make connection with the gear wheel 31, then the shaft 14, will be driven through the gear 18, that meshes with the gear wheel 19, on the counter shaft 15, and through the gear wheel 24, thus driving the shaft 14 at a lower number of revolutions, per minute, than that at which the shaft, 13, is being rotated. A further reduction of speed is accomplished when the gear wheel 25 is in mesh with the gear wheel 32.

Longitudinal end motion of the counter shaft 15 is taken up by the adjustable nuts 35—35.

So far, my description has referred to a device, and the parts thereof, that are common in automobile construction, of which that herein disclosed is typical.

My improved dynamo drive and engine starting device is included in a separable housing, the walls of which are indicated by 36, which is attachable to the housing, 10, of the speed-changing transmission, by means of bolts 37.

In the illustrated embodiment of my invention, as depicted in the accompanying drawings, a compound transverse shaft 38 is constantly and directly connected by means of a longitudinally shiftable clutch member 39 to a clutch member 40, fixed by pin 41 on the shaft of the dynamo electric machine 42, and this transverse shaft 38 is so arranged with reference to the speed changing device, heretofore adverted to, as to receive power from, or transmit power to, the dynamo electric machine, or the engine, and it is so placed, in relation to the parts of the said speed-transmission device, that it may be brought into engagement with either the engine shaft, 13, of the speed changing transmission, or the counter shaft 15 thereof, as will be hereinafter more fully explained.

Throughout the description and the claims hereof, I shall refer to the shaft 38 as the "transverse shaft",—a descriptive designation in contradistinction to the other shafts to which reference has heretofore been made,—and this expression is not intended as a limiting term. One can well imagine that the teachings of my specification may be fully complied with, without the necessity of placing the shaft referred to in transverse position with reference to the other shafts and still retain the essential beneficial features of my invention as defined by the claims.

The shaft member, 43, carries on its end the squared socket clutch member, 39, secured thereto as by key 44. It is provided with a series of radially extending teeth 39', for engagement with similar teeth 45 in the clutch member 46.

The compound shaft 38 is capable of slight longitudinal movement, whereby the teeth 39' may be brought into engagement with the teeth 45 of the clutch member 46, or it may be moved so that these teeth are taken out of driving engagement, but the clutch members 39 and 40 are constantly in positive rotatable engagement.

The clutch member 46 is screw threaded to the end of the hub of a spiral pinion, 47, and is thereby rotatably secured to the said pinion. The pinion 47 is normally loose on the shaft 43, and is constantly in engagement with its driving spiral gear wheel, 48, that is rotatably secured to the countershaft 15, by means of the feather 49.

Ball bearings 50 are provided in the housing 36 for the transverse compound shaft, 38.

Overlying the reduced end, 51, of the shaft member 43, is a shaft member, 52, that is rotatably secured to the member, 43, by a pin, 53, which takes through a slot 54, in the member, 52, by which means the members 52 and 43 are rotatably secured together, but are permitted to move longitudinally and relatively to a limited degree determined by the pin 53 and the length of the slot 54. To the shaft member 52 the worm wheel 55 is secured as by screw threaded engagement, as at 56, and by means of the feather 57, so that the worm wheel 55 shall positively move with the shaft 52.

As heretofore stated, the transverse shaft member 52 overlies a portion of the shaft member 43. The reduced portion, 51, of the shaft 43 is within the interior of the axial bore of shaft 52, and between these two members is an open, helical, compression spring, 58, which tends to hold the two shaft members 43 and 52, extended, as shown in Fig. 3, with the pin 53 in contact with the outer end 59 of the slot 54, and thereby to disengage the clutch members 39 and 46 upon movement of the shaft member 52 to the right. When the shaft member 52 is moved to the left, the part 59 thereof engages the pin 53, and thereby moves the shaft member 43 to the left to a degree sufficient to cause it to engage the clutch members 39 and 46 for the purpose of connecting the dynamo with the spiral gear pinion 47 and spiral gear wheel 48, on the counter shaft 15.

The flange coupling 17, the means by which the engine is to be rotatably secured to the engine shaft 13, is screw threaded, as at 60, and carries a worm wheel 61, which makes screw threaded engagement therewith, so as to be positively rotated with the engine shaft 13.

To the outer end of the shaft member 52, is secured a sleeve, 62, by a nut 63, having threaded engagement with the outer end of the shaft 52. A shroud sleeve 64 provides a stuffing box 65, for the reciprocable sleeve, 62, and is screw threaded, as at 66, into the housing, 36. The shroud, 64, in connection with the sleeve, 62, affords a complete shroud or covering for the shaft, 52, in all positions thereof.

Loosely surrounding the shaft, 52, is a collar, 67, which affords an abutment for the open helical, compression spring 68. The other end of the spring 68, abuts against the closed end of the sleeve 62, as at 69, thereby tending to press collar 67 into more intimate contact with a longitudinal thrust ball bearing, 70. The spring 68 also serves as a resisting means to prevent too sudden longitudinal movement of shaft member 52 toward shaft member 43.

In Fig. 2, it will be observed, the inner end of the sleeve 64 has made contact with the collar 67, and by this means, the end thrust of the shaft, 38, due to the operation of the worm 55, when in engagement with the worm wheel 61, is taken care of.

As heretofore stated, the compound shaft 38 is susceptible of some longitudinal expansion and contraction, the member, 52, being capable of longitudinal movement with reference to the member 53, as clearly appears in Fig. 2 and Fig. 3.

For the purpose of manually moving the shaft member 52, and its associated sleeve 62, longitudinally, I have shown a hand lever 71, engaging the annular groove 72, in the end of the sleeve 62, and I have shown a latch 73, for holding the parts in the respective positions shown in Fig. 3.

The use and operation of my device are as follows: In Figs. 1 and 3 the parts are shown in their respective positions which they occupy when the apparatus and engine are at rest, and it is therefore apparent that now the engine may be rotated without rotating the load shaft, 14. To start the engine, by the instrumentality of the dynamo electric machine operating as an electric motor, it is necessary first to free the lever 71 from the latch 73 and move the lever 71, thereby to permit disengagement of the clutch members 39 and 46, by the operation of the compression spring 58, which will move the member 43 to the right, when permitted by the abutment 59 of the shaft member 52. Now, the electric circuit should be closed between the dynamo electric machine 42 and the storage battery, when the dynamo electric machine will begin to operate as an electric motor and will at this time rotate the shaft 43 without rotating either of the shafts 13 or 15, as both clutches therewith are disengaged. After the electric motor has obtained its speed, then the lever 71 is further moved, so as to longitudinally move the shaft member 52 and the worm 55 into the positions indicated in Fig. 2. When this engagement is effected, the engine shaft 13, will be rotated by the operation of the worm 55 in association with the worm wheel 61, at a relatively slow speed, but with sufficient velocity to start the engine. The motor will thus continue to rotate the engine until said engine has performed the necessary operative cycles for it to become self propelling just as the same results are effected when the shaft of the engine is manually rotated as by a starting crank. After the engine has obtained its speed, by its self propelling means, and the peripheral velocity of the worm wheel 61 is greater than when the same is driven by the electric motor, the worm 55, and its associated shaft member 52, with the sleeve 62, will be pushed to the left by the greater velocity of the gear wheel 61, until the lever 71 moves over and makes engagement with the latch, 73, which serves the purpose of holding the parts in the positions described and as shown in Fig. 3. While the shaft member 52 is being moved to the left in the manner described and just before the end of the movement, the shaft member 43 is moved slightly to the left, by the engagement of the part 59, of the shaft member 52, with the pin 53, of the shaft member 43, thereby to cause the engagement of the clutch member 39, secured to the shaft 43, with the clutch member 46, secured to the spiral gear pinion 47. Thus, there is provided means for driving the dynamo electric machine as an electric generator, by the operation of the engine. As, heretofore stated, the counter shaft 15 is constantly in rotation during the time that the engine shaft, 13, is in rotation, and now the spiral gear 48, being in mesh with the spiral pinion 47, and connected with the dynamo 42, through the clutch members 46 and 39, will rotate the armature of the dynamo at a speed of sufficient velocity to make it a current generator instead of an electric motor; the speed relation of the shafts of the two driving means being proportioned in each instance for most efficient operation thereof.

I realize of course that the dynamo armature will be driven by the variable speed engine at a correspondingly variable speed, but it may be provided with other means, not herein of interest, for delivering a current in the electric circuit with which it is associated at constant potential under varying conditions of speed. That feature of the dynamo, and its associated electrical devices, forms subject matter for another application.

It will be observed, from the described operation, that the compound shaft 38 cannot be associated with the engine shaft 13 and the counter shaft 15, in the manner described, at one and the same time.

In the operation of the device, it is not essential that the operator should wait until the engine has automatically disconnected the worm 55 from its associate worm wheel 61, as this may be manually done, through the instrumentality of the lever 71, as soon as the engine has made one or two explosions. The automatic operation of disengaging the couplings between the shafts 13 and 38, however, is to be preferred.

While I have herein described a single embodiment of my invention, with considerable particularity and detail, I wish it to be understood that I do not care to be limited to the construction heretofore disclosed as considerable variation may be made therefrom, by persons skilled in the art, without departing from the spirit of the invention and within the scope of the appended claims.

What I claim is:

1. The combination, with an engine shaft, a countershaft and suitable connections between the countershaft and engine shaft, of a motor-generator shaft transversely positioned with respect to said countershaft and engine shaft, and alternatively operable connections between said motor-generator shaft and the engine shaft and between the motor-generator shaft and the counter shaft for unidirectional variable-speed connection of the engine and motor shafts.

2. The combination, with an engine shaft, a counter shaft and suitable connections between the engine shaft and counter shaft, of a motor-generator shaft, a gear on the engine shaft, a gear on the countershaft, coöperating gears on the motor-generator shaft, and operating means for said gears alternatively to connect the engine shaft for rotation by the motor-generator shaft or to connect the motor-generator shaft for rotation by the engine shaft.

3. The combination, with an engine shaft, a countershaft and suitable connections between the engine shaft and countershaft, of a motor-generator shaft, connections between said motor-generator shaft and the engine shaft and between the motor-generator shaft and the countershaft, manually operable means to effectuate said connections between the motor-generator shaft and the engine shaft for rotation of the latter through the agency of the motor-generator shaft, and automatic speed-responsive means for disabling said connections and automatically effectuating the connections between the motor-generator shaft and the countershaft for rotation of the motor-generator shaft through the agency of the countershaft and engine shaft.

4. The combination, with an engine shaft, a countershaft and suitable connections between the engine shaft and countershaft, of a motor-generator shaft, connections between said motor-generator shaft and the engine shaft including a worm, connections between the motor-generator shaft and countershaft including a spiral gear, and means for operating said connections alternatively to connect the motor-generator shaft and engine shaft through said worm or through said spiral gear and countershaft.

5. In a device of the character described, an engine shaft, a motor shaft at right angles thereto, a worm wheel fixed on said engine shaft and a coöperating worm rotatably fixed with respect to said motor shaft, and longitudinally movable out of coöperating position upon rotation of the engine shaft at greater speed than the motor shaft.

6. In a device of the character described, an engine shaft, a countershaft, a motor-generator shaft at right angles to said engine and countershafts, a worm wheel on said engine shaft, a coöperating worm rotatably fixed with respect to said motor-generator shaft and longitudinally movable out of cooperating position upon rotation of the engine shaft at greater speed than the motor-generator shaft, and other connections between the engine and motor-generator shafts comprising gears between the motor-generator shaft and countershaft operable upon longitudinal movement of said movable worm.

7. The combination with an engine shaft and a countershaft, of a motor-generator shaft having two sections longitudinally shiftable with respect to each other, suitable connections between one section and the engine shaft and other connections between the other section and the countershaft, said two connections being effective alternatively according to the relative position of said shiftable sections.

8. The combination with parallel shafts and suitable gear wheels thereon, of a transverse shaft, coöperating gears thereon, said transverse shaft comprising relatively shiftable sections for alternation of the connections between the parallel shafts and the transverse shaft by means of said gears, a lever connected to one section to move it, and longitudinally yieldable connections between said section and the other section for movement of said other section to positions determined by the position of the lever-governed section.

9. The combination with parallel shafts and suitable gear wheels thereon, of a transverse shaft, coöperating gears thereon, said transverse shaft comprising relatively shiftable sections for alteration of the connections between the parallel shafts and the transverse shaft by means of said gears, a lever connection to one section to move it, and connections between said section and the other section, comprising a spring tending to separate the sections and a stop therefor, for moving said other section to a proper position determined by the position of the lever-governed section.

10. The combination, with an engine shaft, a work shaft in alinement therewith, a counter shaft parallel to said engine shaft and work shaft, and suitable connections between the counter shaft and engine shaft and between the work shaft and counter shaft, of a motor-generator shaft and alternatively operable connections between said motor-generator shaft and the engine shaft and between the motor-generator shaft and the counter shaft for purposes described.

In testimony whereof I hereunto set my hand in the presence of two witnesses.

VINCENT G. APPLE.

In the presence of—
N. E. SNYDER,
E. V. MARTIN.